July 14, 1959  W. E. RUDNICKI ET AL  2,894,790
AXLE CONSTRUCTION
Filed Dec. 13, 1956

W. E. RUDNICKI
A. O. ROBERTS
INVENTORS

BY E. C. McRae
J. R. Faulkner
J. H. Oster

ATTORNEYS

United States Patent Office 2,894,790
Patented July 14, 1959

2,894,790

AXLE CONSTRUCTION

William E. Rudnicki, Detroit, and Albert O. Roberts, Dearborn, Mich., assignors to Ford Motor Company, Dearborn, Mich., a corporation of Delaware Application December 13, 1956, Serial No. 628,026

2 Claims. (Cl. 308—207)

This invention relates generally to an axle construction for a motor vehicle, and has particular reference to an axle construction incorporating means for maintaining a bearing preload.

In motor vehicle axle construction it is important to accurately maintain the position of the driving pinion and the differential ring gear in order to insure correct pinion and gear mesh position for continued quiet and wear-free operation. Normally this is accomplished by means of an adjustment on the pinion spindle which provides a predetermined preload on the bearings. Due to the inflexibility of the housing, however, this preload is often quickly lost due to initial bearing wear during the break-in period.

It is, therefore, an object of the present invention to provide an axle construction in which means are provided for maintaining a bearing preload through the initial wear period so that the pinion position can be accurately maintained and the quietness of the axle retained over a long period of vehicle operation. In one embodiment of the invention this is accomplished by so shaping an intermediate portion of the differential carrier housing as to provide for deflection thereof axially of the pinion spindle during the initial preload adjustment. The construction is such that sufficient axial deflection of the housing occurs to accommodate initial bearing wear and to maintain a reserve bearing preload to hold the pinion position constant. In another embodiment of the invention this result is achieved by providing resilient means such as a separate spring acting between a portion of the carrier housing and one of the bearings to obtain the necessary axial deflection to maintain the bearing preload.

Other objects and advantages of this invention will be made more apparent as this description proceeds, particularly when considered in connection with the accompanying drawings wherein.

Figure 1:
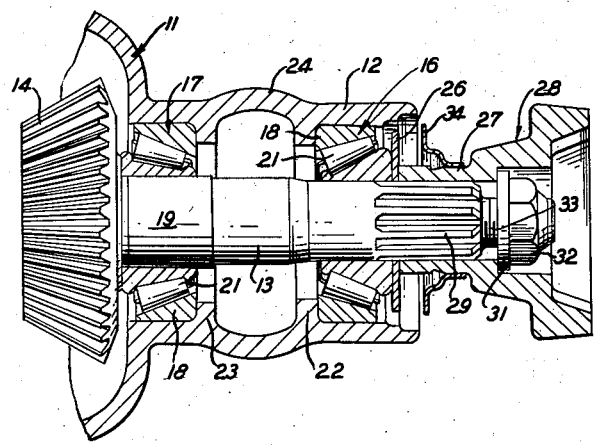
Figure 1 is a vertical cross sectional view through a portion of a vehicle axle incorporating the present invention.

Referring now to the drawings, and particularly to Figure 1, the reference character 11 indicates generally a differential carrier housing having a forwardly projecting nose portion 12. A spindle 13 is located in the housing and has an integral pinion 14 at the rearward end thereof.

The spindle 13 is journaled in the housing by means of front and rear bearing assemblies 16 and 17 respectively. The bearing assemblies 16 and 17 are substantially identical except for being reversed. Each has an outer bearing cup 18, an inner bearing cone 19 and a plurality of intermediate tapered roller bearings 21. The carrier housing 11 is formed with a pair of axially spaced annular shoulders 22 and 23 engaging the bearing cups 18 of the front and rear bearing assemblies.

It will be noted that the nose portion 12 of the carrier housing 11 is generally cylindrical in shape but is provided with a radially outwardly bowed central portion 24 located intermediate the shoulders 22 and 23, for a purpose to be described more in detail hereinafter.

A washer 26 and the hub 27 of a universal joint flange 28 are splined upon the forward portion 29 of the spindle 13, being held thereon by means of a washer 31 and nut 32 adjustably threaded upon the reduced threaded end portion 33 of the spindle 13. A dust deflector 34 is mounted upon the hub 27 of the universal joint flange and space is provided between the flange of the dust deflector and the washer 26 for a conventional oil seal (not shown). The universal joint flange 28 forms the rearward portion of a conventional universal joint joining the pinion spindle 13 with the vehicle propeller shaft (not shown).

During assembly, the nut 32 is tightened to obtain a preload torque upon the tapered roller bearings. This preload may be in the order of 18 to 28 inch pounds. During this preload adjustment, the bowed central portion 24 of the carrier housing distorts radially outwardly to provide a shortening or deflection of the carrier housing of a substantial amount, for example in the order of .010 to .012 inch.

The distortable central portion 24 of the housing thus maintains a sufficient bearing preload during conditions of normal initial bearing wear. Even though a certain amount of axial deflection may be lost as a result of this initial bearing wear, sufficient deflection remains to retain the pinion 14 in its proper position.

It will be understood that the particular shape of the distortable section 24 of the carrier housing may be varied and that its cross sectional thickness may likewise be varied to provide the appropriate deflection characteristics for the particular axle construction.

Figure 2:
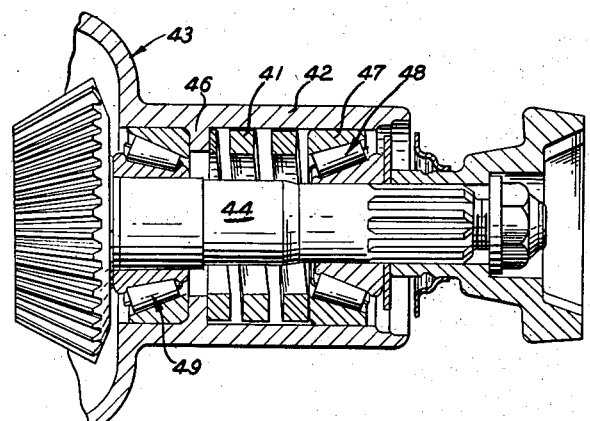
Figure 2 is a view similar to Figure 1 but showing a modification.

Figure 2 illustrates a modification of the invention in which the function of the distortable carrier housing of the Figure 1 modification is performed by a relatively heavy helical compression spring 41. The spring 41 is housed within the nose portion 42 of the differential carrier housing 43 in concentric relation with the spindle 44. One end of the spring abuts an annular shoulder 46 formed in the housing and the opposite end abuts the bearing cone 47 of the front bearing assembly 48.

It will be apparent that the heavy spring 41 is axially deflectable during the bearing preload adjustment and has a sufficient axial deflection to provide a reserve available to maintain the pinion spindle position throughout and also after the initial break-in period.

The invention also contemplates the location of the spring between the rear bearing assembly 49 and a housing portion, in lieu of the illustrated location between the front bearing assembly 48 and the housing portion. Likewise, other types of springs may be used if desired such as an axially deflectable spring washer.

It will be understood that the invention is not to be limited to the exact construction shown and described, but that various changes and modifications may be made without departing from the spirit and scope of the invention, as defined in the appended claims.

What is claimed is:

1. In an axle construction for a motor vehicle, a housing, a spindle in said housing, a gear on said spindle, a pair of axially spaced tapered roller bearings mounted in said housing and rotatably supporting said spindle, said housing having a pair of axially spaced shoulders engaging said pair of bearings respectively and forming stops therefor, the portion of said housing intermediate said shoulders being bowed radially outwardly and radially unsupported, and adjustable means associated with said spindle to apply an axial force to said housing axially distorting the unsupported bowed portion of said housing to maintain a predetermined preload on said bearings.

2. In an axle construction for a motor vehicle, a housing having a generally cylindrical forwardly extending portion, a spindle in the cylindrical portion of said housing, a gear on the rearward end of said spindle, a pair of axially spaced tapered roller bearings mounted in the cylindrical portion of said housing and rotatably supporting said spindle, said housing intermediate said bearings being unsupported radially and having an arcuate section extending axially and bowed radially outwardly, and adjustable means for applying an axial load distorting said arcuate bowed section of said housing to shorten the spacing between said bearings and maintain a preload torque on said bearings.

References Cited in the file of this patent

UNITED STATES PATENTS

| | | |
|---|---|---|
| 1,700,837 | Fisher | Feb. 5, 1929 |
| 2,314,622 | Klamp | Mar. 23, 1943 |
| 2,597,161 | Megel | May 20, 1952 |

FOREIGN PATENTS

| | | |
|---|---|---|
| 150,760 | Sweden | July 12, 1955 |
| 936,965 | Germany | Jan. 26, 1956 |